United States Patent [19]
Johnsen

[11] Patent Number: 5,587,616
[45] Date of Patent: Dec. 24, 1996

[54] ROTOR FOR A DYNAMOELECTRIC MACHINE HAVING A ONE-PIECE ROTATION RECTIFIER

[75] Inventor: Tyrone A. Johnsen, Rockford, Ill.

[73] Assignee: Sundstrand Corporation, Rockford, Ill.

[21] Appl. No.: 57,718

[22] Filed: May 4, 1993

[51] Int. Cl.$^6$ .......................... H02K 11/00; H02K 1/32
[52] U.S. Cl. .......................... 310/68 D; 310/61
[58] Field of Search .................... 310/61, 68 R, 310/68 D, 71, 42; 257/723, 727, 910; 363/108, 126, 141

[56] References Cited

U.S. PATENT DOCUMENTS

| | | | |
|---|---|---|---|
| 4,482,827 | 11/1984 | Baldwin | 310/68 D |
| 4,570,094 | 2/1986 | Trommer | 310/68 R |
| 4,581,695 | 4/1986 | Hoppe | 363/145 |
| 4,603,344 | 7/1986 | Trommer | 357/76 |
| 4,628,219 | 12/1986 | Troscinski | 310/68 D |
| 4,806,814 | 2/1989 | Nold | 310/68 D |
| 4,959,707 | 9/1990 | Pinchott | 357/76 |
| 4,987,328 | 1/1991 | Shahamat | 310/68 D |
| 5,003,209 | 3/1991 | Huss et al. | 310/68 D |
| 5,124,603 | 6/1992 | Hayward et al. | 310/68 D |
| 5,166,564 | 11/1992 | Shahamat et al. | 310/68 D |
| 5,191,248 | 3/1993 | Huss | 310/68 D |
| 5,237,227 | 8/1993 | Huss | 310/54 |

*Primary Examiner*—Clayton E. LaBalle
*Attorney, Agent, or Firm*—Lawrence E. Crowe

[57] ABSTRACT

A compact rotor for a dynamoelectric machine in the form of a brushless alternator is provided through the use of a compact rotating rectifier of unitary construction and a suppression resistor which are mounted within the rotor. The rectifier is of an elemental construction in which all elements of the rectifier perform dual functions as essential structure and as elements of an electrical circuit. The rotor, rectifier, and resistor are highly integrated and configured in a complementary manner such that virtually all non-essential structure related to the rectifier and resistor are eliminated, and such that electrical connections between the components of the rotor are significantly simplified. The rotor also includes features for directing a flow of coolant about the rectifier and the resistor.

35 Claims, 7 Drawing Sheets

ROTOR FOR A DYNAMOELECTRIC MACHINE HAVING A ONE-PIECE ROTATION RECTIFIER

FIELD OF INVENTION

This invention relates to dynamoelectric machines and more particularly to a rotating rectifier and a rotor incorporating the compact rotating rectifier for use in a dynamoelectric machine.

BACKGROUND OF INVENTION

Where it is desired to convert mechanical energy into electrical energy, a dynamoelectric machine in the form of a generator is typically utilized. In principle, such machines achieve the desired energy conversion by utilizing a phenomenon known as magnetic induction whereby relative motion between a magnetic field and an electrical conductor disposed within the magnetic field will induce a flow of current in the electrical conductor. In practice, such machines typically employ a rotating member known as a rotor mounted within a stationary member known as a stator, with the rotor being rotatably driven by some form of prime mover such as a turbine engine operably connected to the rotor.

In general, it is desirable to design such a machine such that it is not necessary to utilize devices such as brushes or slip rings for conducting electrical current to or from the rotor because such devices are subject to wear and therefore reduce the reliability of the generator.

Where the need for electrical current is relatively small, such a "brushless" design is conveniently provided by placing the electrical conductor in the stator and providing one or more permanent magnets within the rotor to create a magnetic field. As the rotor is driven, the rotating magnetic field induces a flow of current in the stationary electrical conductor which may be conveniently connected to deliver the induced current to an electrical load connected to the stationary electrical conductor.

Where the need for electrical current is substantial, however, other means for producing an electrical field in the rotor are typically utilized. Such means are generally provided by placing a winding in the rotor which when connected to a source of current becomes, in effect, an electromagnet capable of producing a rotating magnetic field of sufficient intensity to allow generation of the desired substantial amount of electrical current. Some means for supplying the electrical current to "excite" the winding in the rotor, which is generally known as a main field winding, must be provided, however, preferably without resorting to the use of slip rings or brushes.

It is known that the required excitation current may be conveniently supplied without resorting to brushes or slip rings in a generator configuration typically known as a brushless alternator which utilizes magnetic induction to produce and to couple the excitation current to the main field winding.

A typical brushless alternator has three distinct generating systems, including a main generator, an exciter generator, and a permanent magnet generator (PMG). Each of the generating systems include a rotating member mounted within a common rotor of the brushless generator and a stationary member mounted within a common stator assembly of the brushless alternator. The rotating member of the permanent magnet generator includes one or more permanent magnets, known as a PMG field assembly, which establishes a rotating magnetic field when the rotor is driven by a prime mover. The rotating magnetic field established by the permanent magnets is employed to induce an alternating current (AC) in a stationary PMG armature winding which is located within the stator of the brushless alternator. This induced alternating current is in turn rectified in a stationary rectifier connected to the stator to provide a direct current (DC) which is supplied to a stationary field winding of the exciter generator also located within the stator. The direct current is employed by the field winding of the exciter generator to produce a stationary magnetic field within which an exciter armature winding attached to the rotor is rotated to generate a higher level of current, typically in the form of a three-phase alternating current which is connected, by means to be described hereinafter, to a main field winding located within the rotor. The main field winding generates a rotating magnetic field which is used to induce the main flow of AC current from the main generator stator to the electrical load.

In order to generate a magnetic field of sufficient strength in the main field winding, it is necessary to utilize a direct current as opposed to an alternating current. Since the output of the exciter armature winding is an alternating current, some means must be provided within the rotor for rectifying this alternating current to a direct current. A rotating rectifier assembly located within the rotor is utilized for this purpose.

Rotating rectifier assemblies carried in a rotor of a generator are subject to high centrifugal loading, particularly in generators which run at high speeds, requiring that care be taken to ensure that the rectifier has sufficient structural integrity or is adequately supported within the rotor to withstand such loading. Diode semiconductor devices typically used in the fabrication of such rotating rectifier assemblies also dissipate power during use in the form of heat. Without proper cooling, the diode semiconductors will fail.

It is also common practice to provide an electrical noise suppression resistor within the rotor of the brushless alternator, with the suppression resistor being connected in a parallel circuit relationship to the main field winding of the main generator. These resistors also dissipate heat and are subject to the same structural and thermal environment as the rectifier.

In addition to concerns regarding the structural integrity and cooling of the rectifiers, the compactness or lack thereof of the rotor, and particularly the axial length of the rotor, will dictate certain bearing and housing size selections and thus greatly affect the weight and size of the brushless generator. Since the rotating rectifier forms part of the rotor, and therefore influences the size of the rotor, it has long been a goal of generator designers to reduce the rotating rectifier to a simple, elemental form having minimum size and weight.

Through the years, a number of approaches to solving the above problems have been utilized.

In one approach, compression-bonded, discoidal-shaped diode wafers are packaged individually in a housing including means such as a Belleville washer for compressively loading the diode wafers against electrical connection means disposed within the individual housings. A plurality of such diodes, each within its individual housing, is then mounted directly within the rotor or on structural support plates carried by the rotor. Electrical connections required to join the individual diodes into a rectifier circuit are provided by wires or other nonstructural conductor means which are brazed, soldered, crimped, or otherwise mechanically attached to the individual diode packages. Rotating rectifiers utilizing this approach have been shown to work well but are rather bulky due to the multiple housings, springs, and electrical connection means, etc., which are required when each diode wafer is individually packaged in its own housing. U.S. Pat. No. 4,482,827 to Baldwin is exemplary of a rotating rectifier utilizing this approach.

In a second approach, which eliminates much of the redundant packaging inherent in the first approach, the compression-bonded diode wafers are removed from their individual packages and mounted within a common housing together with means for providing the compressive force necessary to ensure good electrical and thermal contact of the diode wafers with electrical connections and heat sinks which are also provided within the common housing. U.S. Pat. Nos. 4,570,094 to Trommer, 4,581,695 to Hoppe, 4,603,344 to Trommer, 4,628,219 to Troscinski, 4,806,814 to Nold, 5,003,209 to Huss et al, are exemplary of rotating rectifiers utilizing the second approach.

Advantages of this approach as compared to Baldwin are that a smaller, more space-efficient package may typically be provided due to elimination of redundant packaging elements such as the individual housing and compressive loading means. Rotating rectifiers utilizing this approach have historically been provided in the form of a modular package which may also include a suppression resistor. These modular packages typically utilize some combination of screw terminals or axially-extending connector pins at one or both ends which provide an additional advantage by facilitating installation and repair of the rectifier and suppression resistor.

In a third approach, as illustrated in U.S. Pat. Nos. 4,959,707 to Pinchott and 4,987,328 to Shahamat, the means for providing compressive force to the diode wafers is eliminated by brazing or soldering the diodes to plates which are then supported within an electrically nonconductive housing and interconnected by electrically conductive means within a common housing. With the third approach, as in the second approach, a resistor may be included within the housing and electrical attachment means in the form of screw terminals, and pins may be utilized to provide a modular package in order to facilitate installation and repair of the rectifier and resistor assembly. As with the first and second approaches, a structural housing is generally required with this approach to maintain the spatial relationship between the internal components and provide structural support for the internal components which are typically not utilized in a structural capacity.

SUMMARY OF THE INVENTION

Accordingly, a primary object of the instant invention is to provide a new and improved dynamoelectric machine. It is also an object of the instant invention to provide such a new and improved dynamoelectric machine having a rotor which is significantly shorter in axial length than has heretofore been produced. It is a further object of the instant invention to provide a rotating rectifier and a suppression resistor in an essentially elemental form in which virtually all parasitic support structure and electrical connection means have been eliminated which are suitable for service in a rotor of a high-speed dynamoelectric machine. It is a still further object of the instant invention that such an essentially elemental rectifier and resistor be provided in a form which may be simply installed within and as easily removed from the rotor without moving any wires and with the removal of a minimum number of screws or other fasteners. Stated another way, it is an object of the instant invention to provide a rectifier and a resistor in an essentially elemental form which may be installed within and removed from the rotor at least as easily as previously-known rectifier and resistor assemblies using the modular construction typical of existing state-of-the-art rectifier and resistor assemblies. It is a still yet further object of the instant invention to provide such an essentially elemental rectifier and resistor in a form which is easily fabricated in a cost-effective manner from a small number of simple parts.

According to one aspect of the instant invention, a rectifier satisfying the above objects is provided in the form of a rectifier assembly configured for rotation about an axis of rotation, with the rectifier comprising:

(a) two axially-spaced field plates having generally planar major surfaces oriented perpendicularly to the axis of rotation;

(b) two layers of diodes sandwiched between the field plates;

(c) a layer of phase plates electrically isolated from one another sandwiched between the layers of diodes; and (d) means for joining the diodes to the field plates and to the phase plates to form a unitary, laminated structure rotatable about the axis of rotation.

According to a second aspect of the instant invention satisfying the above objects, a rotor for a dynamoelectric machine is provided which includes the following:

(a) a rotating member configured for rotation about an axis of rotation and including a source of alternating current and an electrical load;

(b) a rectifier attached to the rotating member for rotation about the axis of rotation and electrically connected between the source of alternating current and the load, the rectifier comprising:

(1) two axially-spaced field plates having generally planar major surfaces oriented perpendicularly to the axis of rotation;

(2) two layers of diodes sandwiched between the field plates;

(3) a layer of phase plates electrically isolated from one another sandwiched between the layers of diodes; and (4) means for joining the diodes to the field plates and to the phase plates to form a unitary, laminated structure rotatable about the axis of rotation.

According to another aspect of the instant invention, the rotor further includes a suppression resistor electrically connected in a parallel circuit relationship with the electrical load. According to yet another aspect of the instant invention, the rotor further includes means for directing a flow of cooling fluid to the rectifier and about the resistor.

According to a further aspect of the instant invention, which satisfies the above objectives, the rotor, the rectifier, and the resistor of the instant invention are highly integrated to eliminate virtually all parasitic support structure related to the rectifier and suppression resistor and to eliminate or greatly simplify all electrical connections between the various components of the rotor. All elements of the rectifier of the instant invention perform dual functions as essential structure and elements of an electrical circuit.

The rotor, rectifier, and suppression resistor are also configured in a complementary manner to preclude electrical misconnection of the rectifier and resistor. In fact, the rectifier and resistor are designed to allow the rectifier and resistor to be installed in either of two positions.

The rotor, rectifier, and suppression resistor are also configured in a complementary manner such that the electrical terminals will accommodate misalignment or tolerance variations among the various components, and such that the electrical terminals are not utilized for structural support of the rectifier and resistor within the rotor. All structural support is provided by an integrated structural interface between specifically designed mounting features of the rectifier and resistor which mate with specific features of the walls of a rotor cavity in which the rectifier and resistor are mounted. By providing means which do not structurally load the electrical terminals, reliability is improved.

In a preferred embodiment of the instant invention, a rectifier satisfying the above objects is provided in the form of a rectifier assembly configured for rotation about an axis of rotation, with the rectifier consisting essentially of the following:

(a) two axially-spaced field plates having generally planar major surfaces oriented perpendicularly to the axis of rotation;

(b) two layers of diodes sandwiched between the field plates;

(c) a layer of phase plates electrically isolated from one another sandwiched between the layers of diodes; and (d) means for joining the diodes to the field plates and to the phase plates to form a unitary, laminated structure rotatable about the axis of rotation.

Other objects and advantages of the instant invention will become apparent from the following specification, taken in conjunction with the accompanying drawings.

DESCRIPTION OF THE PREFERRED EMBODIMENT

Figure 3:
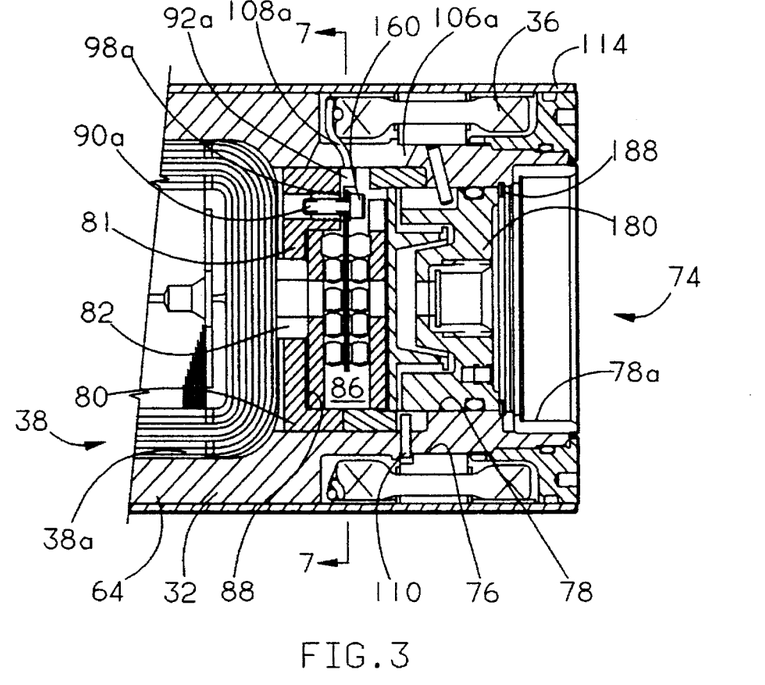
FIG. 3 is a partial, longitudinal, sectional view of the rotor of FIG. 1 taken along a vertical plane extending vertically through the rotor, as depicted in FIG. 1.
Figure 4:
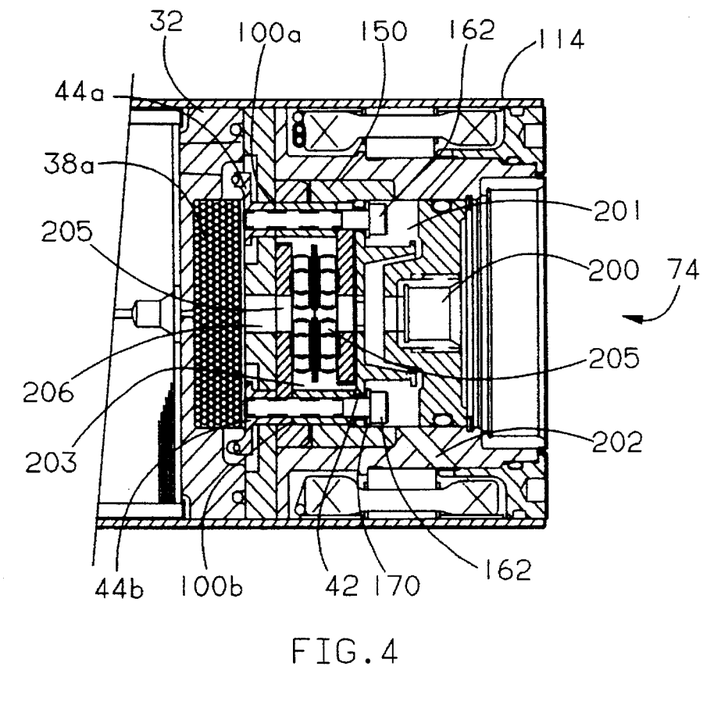
FIG. 4 is a partial, longitudinal, sectional view of the rotor of FIG. 1 taken along a plane passing horizontally through the rotor, as depicted in FIG. 1.
Figure 5:
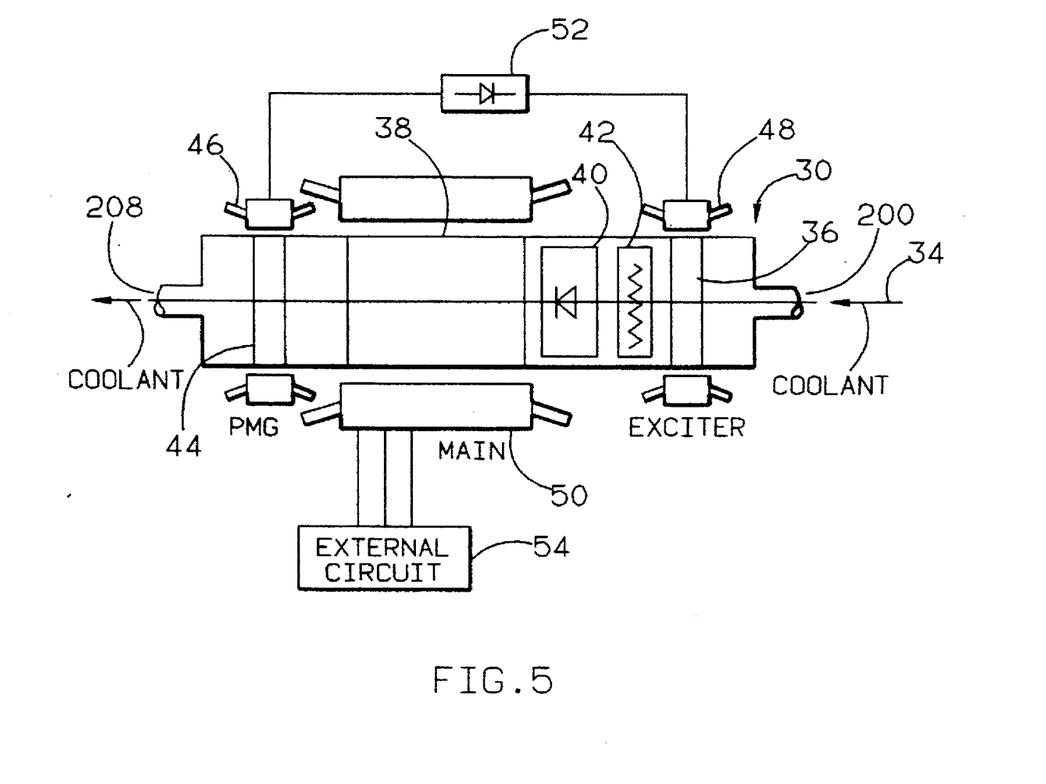
FIG. 5 is a schematic representation of a dynamoelectric machine incorporating the rotor of the instant invention.
Figure 6:
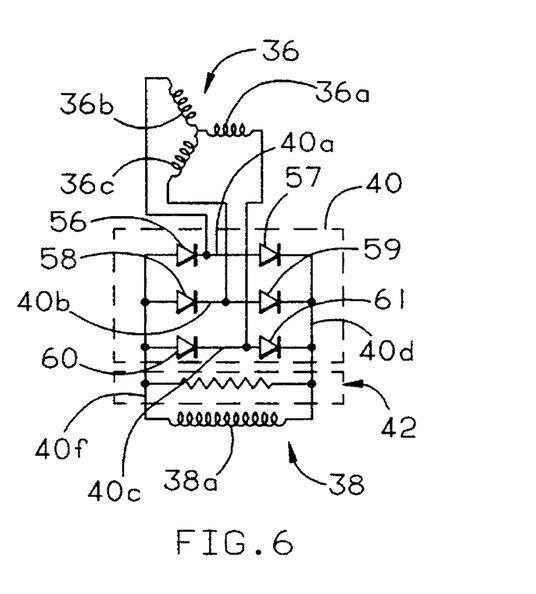
FIG. 6 is an electrical schematic illustrating the circuit relationship between the electrical components mounted within the rotor of the exemplary embodiment of FIG. 1.

Referring now to FIGS. 1–6, an exemplary embodiment of the instant invention is provided in the form of a rotor, generally designated 30, for a dynamoelectric machine. Specifically, the rotor 30, as illustrated pictorially in FIGS. 1–4 and schematically in FIGS. 5 and 6, is a compact, two-pole rotor of the type used in a brushless alternator. The rotor 30 includes a rotating member comprising in combination a shaft 32 journaled for rotation about an axis of rotation 34, a source of alternating current in the form of a three-phase exciter armature assembly 36, and an electrical load in the form of a main field assembly 38.

The rotor 30 further includes a rectifier assembly 40 and a suppression resistor 42, with the exciter armature assembly 36, main field assembly 38, rectifier assembly 40, and suppression resistor 42 being fixably attached to the shaft 32 in a manner to be described in more detail hereinafter for rotation therewith.

As best seen in FIG. 5, the rotor 30 also includes a (PMG) field assembly 44 fixably attached to the shaft 32. The shaft 32 is journaled by bearings (not shown) for rotation within a stationary stator (also not shown). The stator includes a PMG armature winding 46, an exciter field winding 48, and a main armature winding 50 positioned respectively about the PMG field assembly 44, the exciter armature assembly 36, and the main field assembly 38 of the rotor 30. When the rotor 30 is rotated about the axis of rotation 34, the PMG field assembly 44 induces an electrical current in the PMG armature 46 by magnetic induction. The alternating current induced in the PMG armature 46 is rectified to a direct current by a stationary rectifier shown schematically as 52 in FIG. 5. The direct current from the stationary rectifier is applied to the exciter field winding 48 to create a stationary magnetic field about the exciter armature 36.

As seen in FIG. 6, the exciter armature of the exemplary embodiment is a three-phase armature having windings 36a, 36b, 36c connected in a WYE configuration and supplying three-phase alternating currents to common junctions 40a, 40b, 40c, respectively, of the rectifier 40. The rectifier 40 includes six diodes, 56–61, connected in a bridge configuration to the junctions 40a, 40b, 40c to develop a source of direct current available at opposite rails 40d, 40f. The direct current is provided to a single-phase winding 38a of the main field assembly 38. The suppression resistor 42 is connected across the rails 40f, 40d of the rectifier in a parallel relationship with the main field winding 38a. The three-phase voltage developed in the exciter armature windings 36a, 36b, 36c as a result of rotation of the exciter armature assembly 36 within the stationary magnetic field of the exciter field winding 48 is rectified by the rectifier 40 to power the main field winding 38a which generates a rotating magnetic field within the main armature winding 50. The rotating magnetic field generated by the main field winding 38a induces an alternating electric current in the main armature winding 50 which may be utilized by an electrical circuit external to the dynamoelectric machine as illustrated graphically at 54 of FIG. 5.

Returning to FIGS. 1–4, it will be seen that the shaft 32 includes a central, axially-extending, cylindrical portion 64 having an axially-extending, rectangularly-shaped through slot 66 configured to receive the main field assembly 38. Extending axially from one end of the central, cylindrical portion 64 of the shaft 32 is a hollow end shaft 68 having a radially outer surface thereof configured for receipt of the PMG rotor 44 and a bearing (not shown). An annular wall 70 disposed about the axis of rotation 34 extends from the opposite axial end of the shaft 32 to define a second hollow end shaft 72 which terminates in an open end 74 of the shaft 32 with a portion of the radial outer surface 76 of the second hollow end shaft 70 being configured for receipt thereupon of the exciter armature assembly 36 and a portion 78a of the radially inner surface 78 of the second hollow end shaft 72 being configured for receipt of a bearing (not shown).

As best seen in FIGS. 3 and 4, shaft 32 also includes an internal, radially-extending wall 80, located opposite the open end 74 of the shaft 32, with the radially-extending wall 80 providing a partition between the through slot 66 in the central cylindrical portion 64 and a cavity 86 defined by the inner surface 78 of the annular wall 70 and a rectifier support surface 88 of the radially-extending wall 80 which faces the open end 74 of the shaft 32. The rectifier support surface 88 includes three electrically isolated phase terminals in the form of axially-oriented, threaded inserts 90 which are embedded in the radially-extending wall 80 for individual attachment of three phase leads 92a, 92b, 92c extending respectively from the three exciter armature windings 36a, 36b, 36c of the exciter armature assembly 36.

Figure 2:
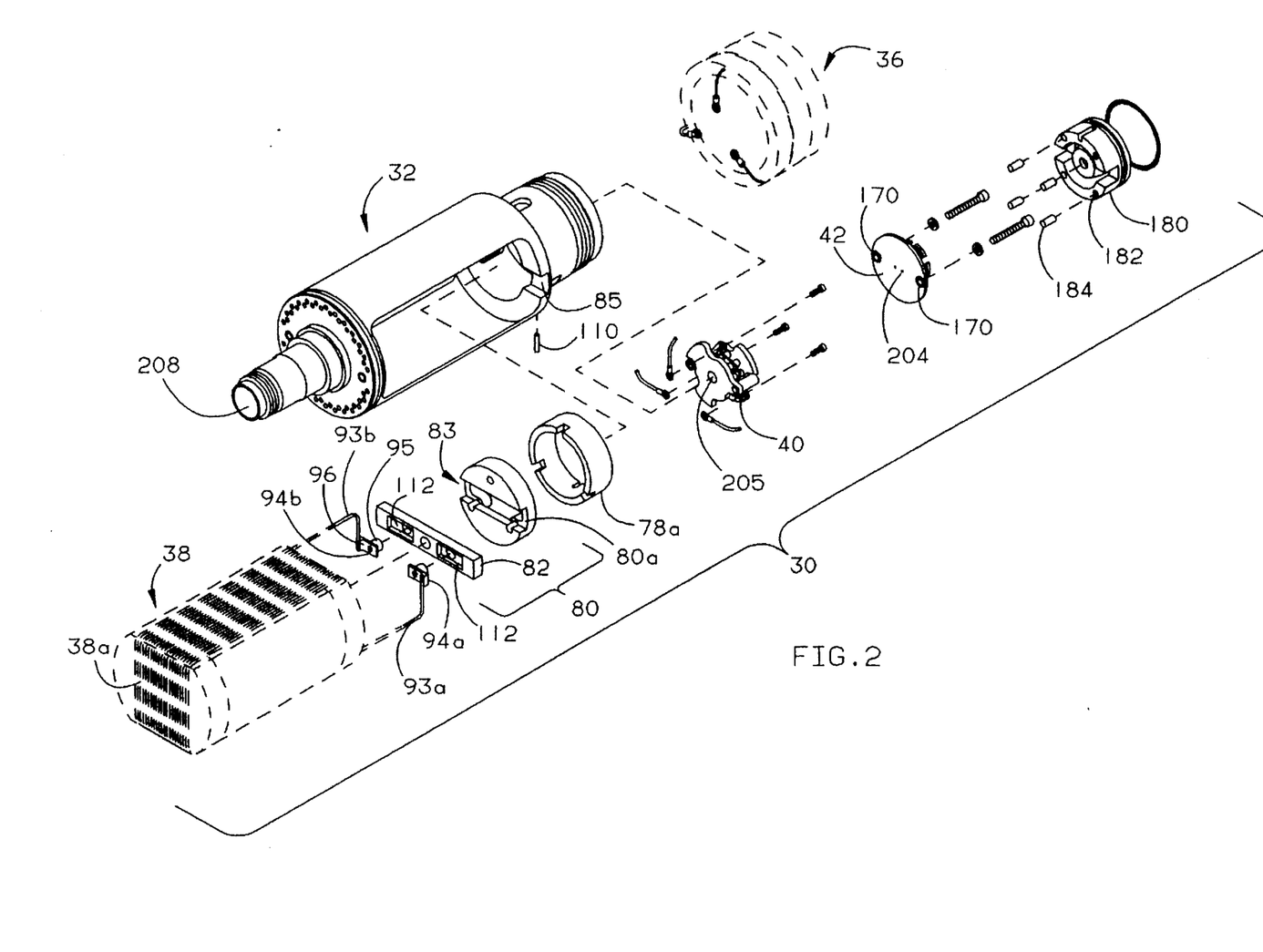
FIG. 2 is an exploded isometric view of the rotor of FIG. 1 viewed from an opposite axial end of the rotor.

The rectifier support surface 88 also includes two electrically isolated threaded field terminals 94a, 94b, as best seen in FIGS. 2 and 4, which extend axially through the radially-extending wall 80 to provide means for electrically connecting a pair of field leads 93a, 93b extending from electrically opposite ends of the main field winding 38a to the DC rails 40d, 40f of the rectifier 40. As best seen in FIGS. 2 and 4, each of the field terminals 94a, 94b of the exemplary embodiment include a generally cylindrical threaded portion 95 extending axially from a rectangular tab 96, with the rectangular tab 96 being joined by a process such as welding, soldering, brazing, or crimping to the field leads 93a, 93b of the main field assembly 38.

As best seen in FIGS. 3 and 4, the threaded inserts 90a, 90b, 90c and field terminals 94a, 94b terminate in axially-facing electrical contact surfaces 98a, 98b, 98c and 100a, 100b disposed adjacent to the rectifier support surface 88.

Figure 7:
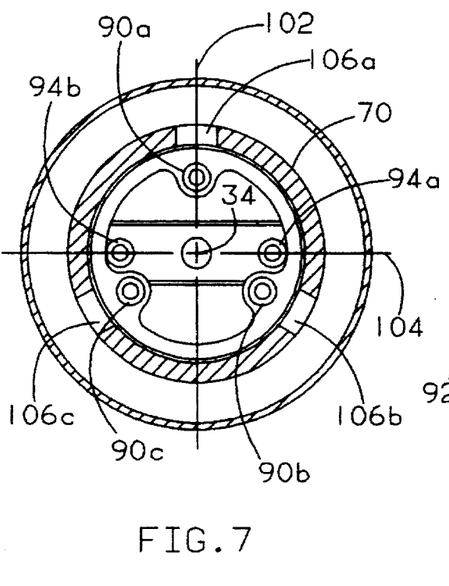
FIGS. 7–7d are all sectional views taken along the line 7—7, as indicated in FIG. 3, illustrating installation of various components of the rotor, which are not sectioned, into the rotor of the exemplary embodiment of FIG. 1.

As best seen in FIG. 7, the threaded inserts 90a, 90b, 90c and the field terminals 94a, 94b are symmetrically disposed along and about an axis of symmetry 102 passing vertically through the axis of rotation 34 in a direction perpendicular to the through slot 66. Specifically, the threaded inserts 90a, 90b, 90c are disposed to define an equilateral triangle centered on the axis of rotation with one of the threaded inserts, 90a as illustrated, also being centered along the axis of symmetry 102. The field leads 94a, 94b are disposed along a line 104 passing perpendicularly through the axis of symmetry 102 at a point coincident with the intersection of the line 104 with the axis of rotation 34.

Figure 7A:
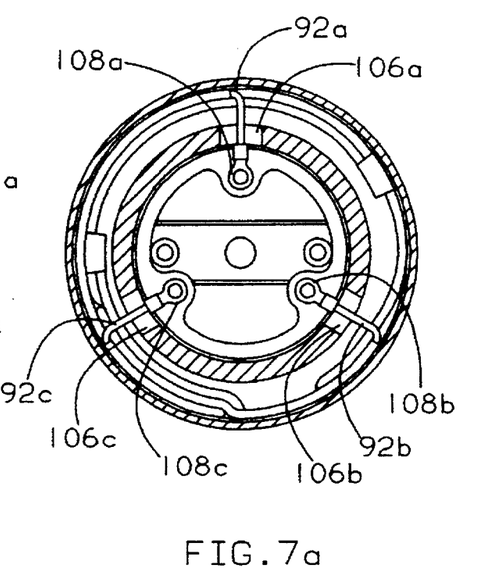

As best seen in FIGS. 3, 7, and 7a, the annular wall 70 of the shaft 32 also includes three radially-extending slots 106a, 106b, 106c disposed adjacent to the threaded inserts 90a, 90b, 90c for passage therethrough of the exciter leads 92a, 92b, 92c, respectively. The exciter leads 92a, 92b, 92c are terminated in ring tongue terminals 108a, 108b, 108c, respectively, and configured such that, when the exciter armature assembly 36 is properly positioned upon and fixably attached to the shaft 32 by a process such as shrink fitting, the ring tongue terminals 108a, 108b, 108c will be disposed in contact with the threaded inserts 90a, 90b, 90c, respectively. An alignment pin 110 protruding from the surface 76 is provided to facilitate alignment of the exciter armature assembly 36 with respect to the phase and field terminals. Additionally, as best seen in FIG. 3, to facilitate the installation of the exciter armature 36, a portion of the walls of the slots 106a, 106b, 106c are angled to help guide the wires 92a, 92b, 92c into proper alignment with the threaded inserts 90a, 90b, 90c.

Figure 1:
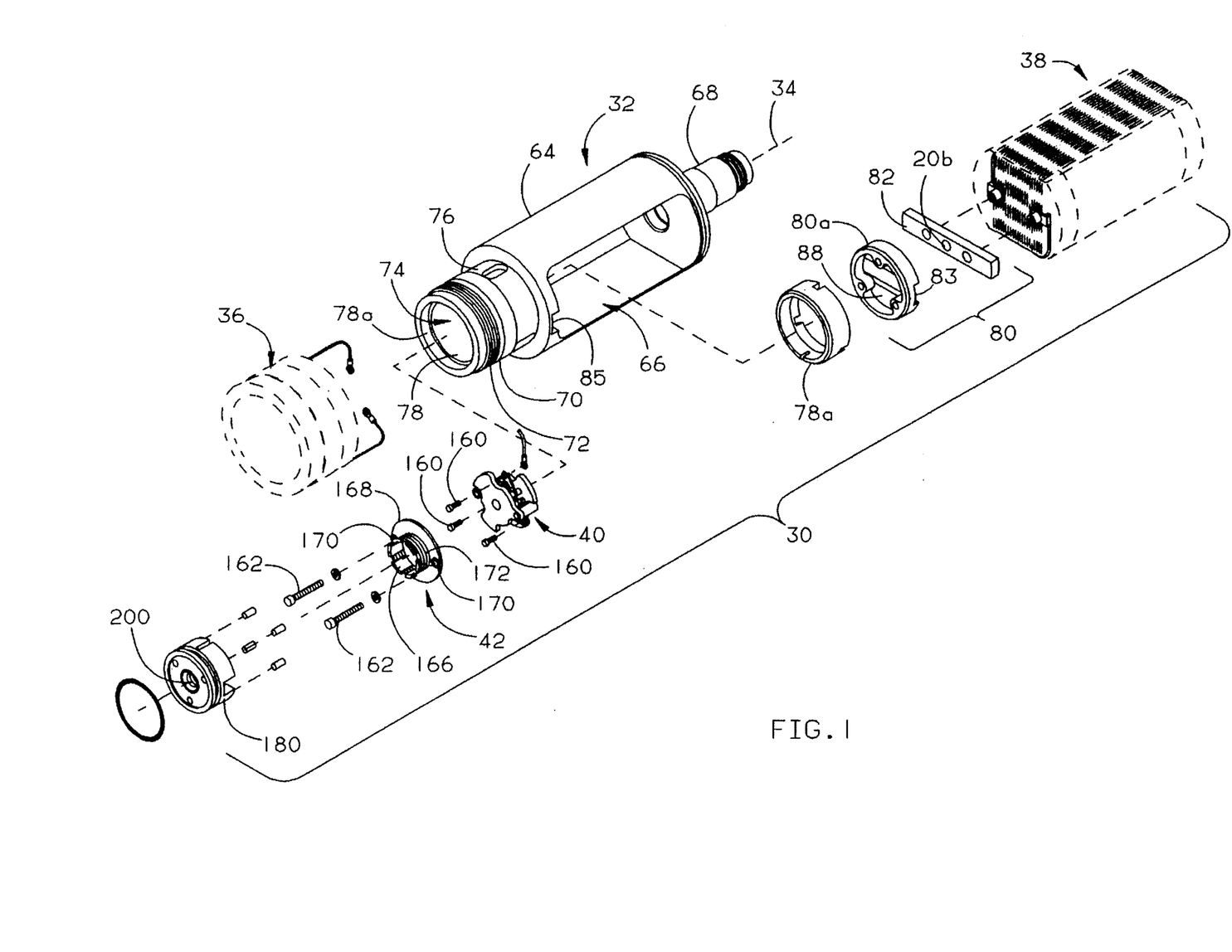
FIG. 1 is an exploded isometric view of an exemplary embodiment of a rotor constructed according to the instant invention, with the rotor being viewed from one axial end thereof.

Returning to the main field assembly 38, it will be appreciated that, with the field terminals 94a, 94b attached as previously described, the cylindrical portions 95 of the field terminals 94a, 94b protrude axially from one end of the main field assembly 38. In order to facilitate installation of the main field assembly 38 into the through slot 66 of the shaft 32, and insertion of the cylindrical threaded portions 95 of the field terminals 94a, 94b into the radially-extending wall 80, a bar-shaped portion 82 of the wall 80 and the central cylindrical section 64 of the shaft 32 extending horizontally about the field terminals 94a, 94b is provided as a removable piece as illustrated in FIGS. 1, 2, and 3. The cylindrical portions 95 of the field terminals 94a, 94b are inserted into the removable bar 82 prior to installation of the main field assembly 38 into the through slot 66 of the shaft 32.

Slots 85 and 83 are provided in the shaft 32 and the radially-extending wall 80, respectively, for the receipt of the removable bar 82 in a manner allowing the combination of the main field assembly 38 and the bar 82 to enter the through slot 66 of the shaft 32 in a horizontal direction.

As best seen in FIG. 2, removable bar 82 also includes a pair of recesses 112 in a surface opposite the rectifier support surface 88 for receipt of the rectangular portion 96 of the field terminals 94a, 94b, thereby providing a reduction in the overall axial length of the rotor 30. The recesses 112 are also configured to engage the rectangular portions of the field terminals 94a, 94b in a manner preventing the field terminals 94a, 94b from rotating within the bar 82 as a result of a fastener, such as a screw 162, being threaded into the cylindrical threaded portions 95 of the field terminals 94a, 94b. The recesses are further configured to allow a limited amount of axial movement of the field terminals 94a, 94b.

A portion of the radially outer surfaces of the main field assembly 38 and the alternate radial ends of the bar 82 are configured to match the radially outer surface of the central cylindrical section 64 of the shaft 32 when the main armature assembly 38 is properly positioned in the through slot 66. A cylindrical can 114, as seen in FIGS. 3 and 4, is attached about the shaft 32 following assembly of the shaft 32, the exciter armature assembly 36, and the main field assembly 38 by a process such as shrink fitting to retain the various elements of the rotating member in the proper relationship and to define closed cavities about the exciter armature 36 and the main field assembly 38 for direction of a cooling fluid about the windings.

Referring now to FIGS. 8–11, an exemplary embodiment of a rectifier assembly, according to the instant invention, is provided in the form of a rectifier 40 configured for rotation about the axis of rotation 34 with the rectifier 40 consisting essentially of the following:

(a) two axially-spaced field plates 120, 121, having generally planar major surfaces oriented perpendicularly to the axis of rotation 34;

(b) two layers of diodes 140 sandwiched between the field plates;

(c) a layer of phase plates 126, 128, 130 electrically isolated from one another, sandwiched between the layers of diodes 140; and (d) means for joining the diodes 140 to the field plates 120, 121 and the phase plates 126, 128, 130 to form the rectifier 40 rotatable about the axis of rotation 34.

Figure 8:
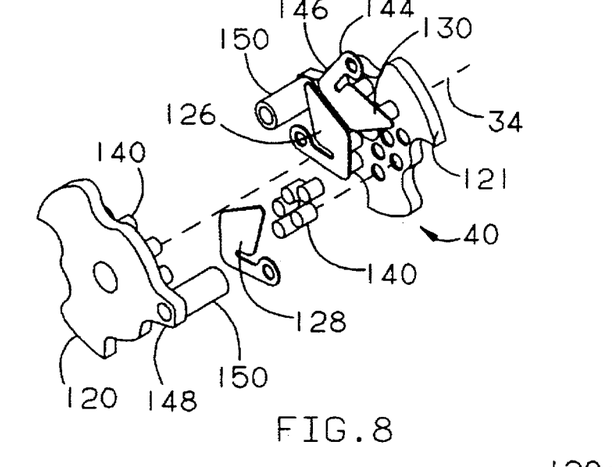
FIGS. 8–11 illustrate an exemplary embodiment of a rectifier, according to the instant invention, as depicted in the exemplary embodiment of the rotor of FIG. 1.

As best seen in FIG. 8, the layers of diodes are comprised of an array of individual semiconductor diode devices 140 integrally joined at one axial end to one of the phase plates 126, 128, 130 and integrally joined at the opposite axial end to one of the field plates 120, 121. The individual semiconductor diode devices 140 are preferably joined to the phase plates 126, 128, 130 and the field plates 120, 121 by soldering. It will be recognized, however, that other processes, including brazing and adhesively bonding, might also be used in joining the semiconductor diode devices to the phase and field plates. Furthermore, it will be understood from the description, claims and drawings that the terms "joining," or "means for integrally joining" as used herein specifically and inherently exclude the use of mechanical clamping devices, such as screws, bellville springs, or structural housings, which were required in prior rectifiers to ensure electrical contact of the phase and field plates with the diodes, or to ensure structural integrity of the rectifier assembly. Each of the semiconductor diode devices 140 is encapsulated within a ceramic material which provides structural support for the diode and allows a liquid coolant to come into intimate contact with the semiconductor diode device 140 for cooling purposes, as discussed hereinafter.

The field plates 120, 121 are fabricated from an electrically conductive material such as beryllium-copper or oxygen-free copper plated with silver. The field plates of the exemplary embodiment are also relatively thick, having a thickness of approximately 0.125" to provide an additional heat sink for the semiconductor diode devices 140.

The phase plates 126, 128, 130 are also formed of an electrically conductive material such as beryllium-copper or oxygen-free copper plated with silver, and are relatively thin, having a thickness of 0.020" in the exemplary embodiment. Oxygen-free copper is preferably utilized for the phase plates 126, 128, 130 due to its greater flexibility as compared to beryllium-copper.

Figure 11:
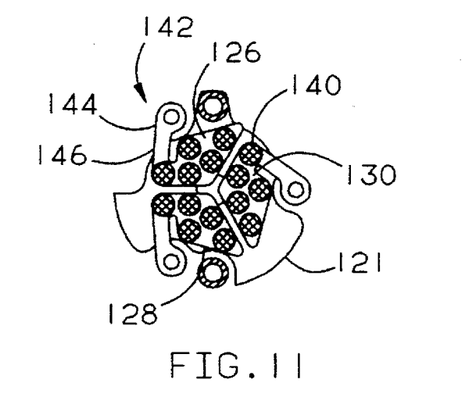

As best seen in FIGS. 8 and 11, the diode semiconductor devices 140 in each of the layers of diodes are arranged in three groups at spaced locations on one of the phase plates 120, 121. Five diodes in parallel for current-carrying capability are located in each group or location. Linear radially outward directed spaces are formed between the respective groups of diodes and semiconductors 140 as arrayed on the field plates 120, 121. The phase plates 126, 128, 130 are connected to the respective groups of diode semiconductor devices 140, with the phase plates also being spaced from one another by linear, equi-angular, and radially-directed spaces which are coincident with the spaces between the groups of diode semiconductor devices 140 as arrayed on the field plates 120, 121.

Means for attaching each of the phase plates 126, 128, 130 to an alternating current source is provided in the form of an apertured tab 142 formed integrally with and connected to each phase plate. In the exemplary embodiment of the rectifier 40, wherein each of the phase plates 126, 128, 130 is fabricated from a thin layer of material, the apertured tabs 142 include at a distal end thereof a ring terminal portion 144 defining the aperture which is connected to the phase plate by a flexible arm portion 146, thereby providing means for the ring terminal portion 144 to be displaced axially from the phase plate without imposing excessive stresses upon either the phase plate or the diodes.

The major surfaces of the field plates 120, 121 opposite the diode layers define a pair of generally parallel, axially-facing rectifier mounting faces 120a, 121a. Means for attaching each of the field plates to an electrical load are provided by an apertured tab formed integrally with and connected to each of the phase plates 120, 121. The apertured tabs 148 of each of the field plates 120, 121 includes an axially-facing electrical contact surface 156 coplanar with the rectifier mounting face 120a, 121a as defined by the particular field plate 120, 121 to which the respective tab 148 is attached. The means for attaching the field plates 120, 121 to a load further includes a pair of tubular standoffs 150 disposed about the apertures and attached to the apertured tabs 148 of the field plates 120, 121 in a manner allowing the tubular standoff 150 to extend axially past the laminated structure of the rectifier 40 in electrically isolated fashion to provide a pair of axially-facing electrical contact surfaces 154 coplanar with the rectifier mounting faces 120a, 121a such that, at each rectifier mounting face 120a, 121a, a coplanar pair of output terminals 154, 156 is provided in the form of the electrical contact surface 156 of the apertured tabs 148 of one of the field plates 120, 121 and the electrical contact surface 154 of the tubular standoff attached to the opposite field plate, thereby allowing either of the field plates 120, 121 to be accessed in an axial direction from either rectifier mounting surface 120a, 121a.

Those skilled in the art will readily recognize that the phase plates 126, 128, 130 are equivalent to the common junctions 40a, 40b, 40c, respectively, of the rectifier 40 as illustrated in FIG. 6, and that the field plates 120, 121 are equivalent to the opposite rails 40d, 40f as illustrated in FIG. 6. It will also be recognized that the six groupings of semiconductor diode devices 140, which constitute the two layers of diodes, are equivalent to the six diodes 56–61, as illustrated in FIG. 6.

Figure 9:
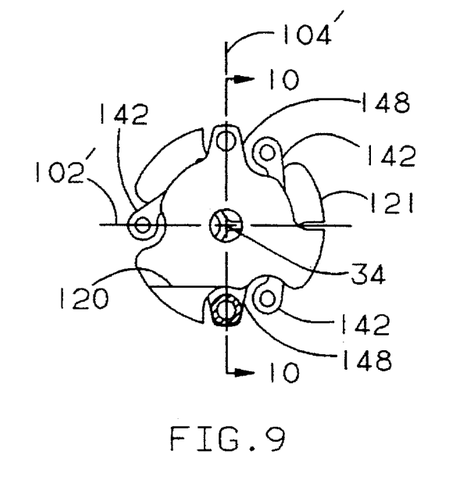
Figure 10:
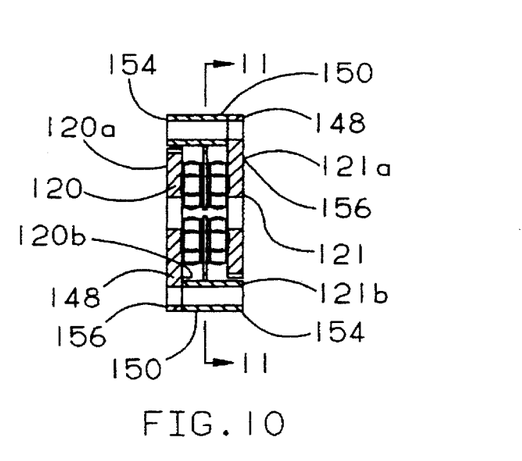

As best seen in FIG. 9, the apertured tabs 148 of the field plates 120, 121 and the apertured tabs 142 of the phase plates 126, 128, 130 are symmetrically disposed along and about an axis of symmetry 102' and 104' respectively passing through the axis of rotation 34 in a pattern matching the pattern previously described with respect to the radial position of the threaded inserts 90a, 90b, 90c and the field terminals 94a, 94b. Specifically, the apertured tabs 142 attached to the phase plates 126, 128, 130 are disposed such that the apertures define an equilateral triangle centered on the axis of rotation with one of the apertures also being centered along the axis of symmetry 102'. The apertured tabs 148 of the field plates 120, 121 are disposed at diametrically opposite locations with respect to the axis of rotation along a line 104' passing perpendicularly through the axis of symmetry 102' at a point coincident with the intersection of the line of symmetry 102' and the axis of rotation 34.

Figure 7B:
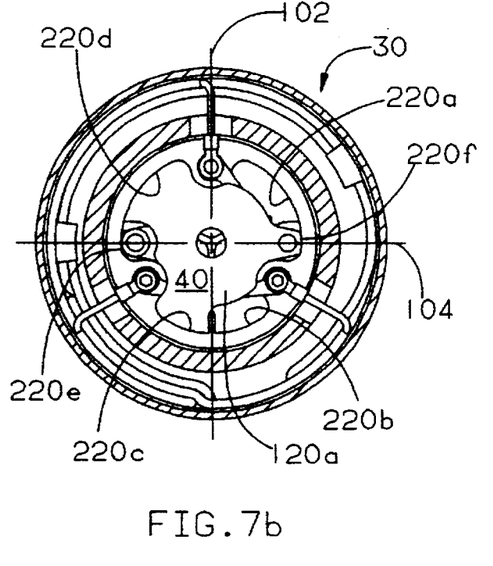
Figure 7C:
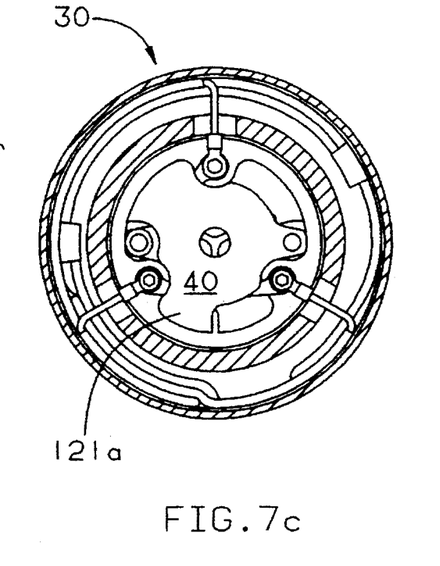

It will be appreciated that the particular symmetrical pattern of the various electrical terminals just described, together with the overall construction of the rotor 30 and the rectifier 40, according to the instant invention, allow the rectifier 40 to be alternatively installed with either mounting face 120a, 121a facially engaging the rectifier support surface 84 without cross connection of the phase and field plates as illustrated in FIGS. 7b, 7c, thereby facilitating assembly.

As seen in FIGS. 3, 7b, and 7c, screws 160 engaging the threaded inserts 90a, 90b, 90c are utilized to establish electrical contact between each of the phase plates 126, 128, 130 and the phase leads 90a, 90b, 90c by clamping the ring tongue terminal attached to one of the phase leads between a threaded insert 90 and the ring terminal portion 144 of the apertured tab 142 attached to the phase plate.

It will be appreciated that the flexible arm portion 146 of the apertured tabs 142 of the exemplary embodiment allow the apertured tabs to deflect somewhat in an axial direction to compensate for any misalignment between the electrical terminals of the rectifier and the phase leads such that electrical contact may be obtained without subjecting the phase plates or the diodes to excessive bending loads.

Figure 7D:
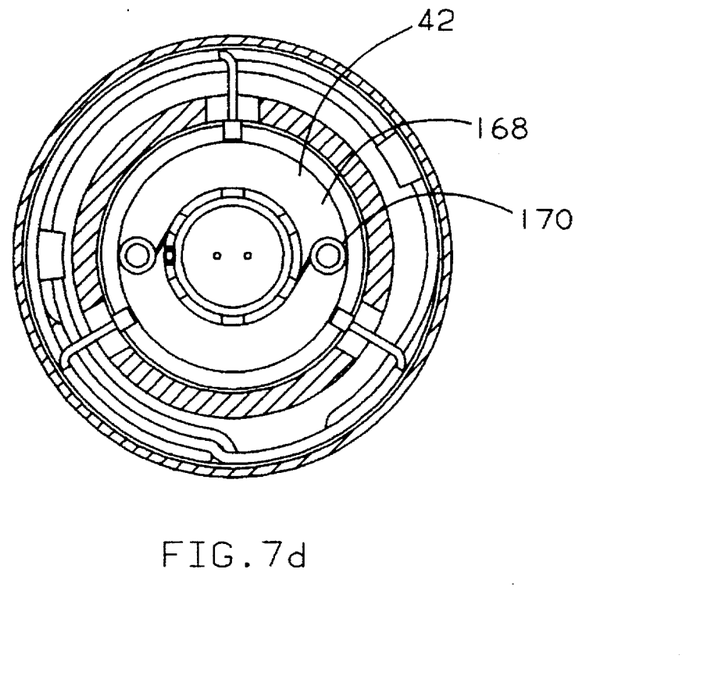

As seen in FIGS. 1, 4, and 7d, the suppression resistor 42 of the exemplary embodiment is comprised of a spool-like structure of electrically insulative material having an axially-extending, bifurcated, cylindrical section 166 extending axially from a radially-extending, axially-flexible base 168 including a pair of terminals in the form of electrically conductive grommets 170 having compliant, axially-facing, electrical contact surfaces. The grommets 170 are disposed in radial alignment with the output terminals 154, 156 of the rectifier 40. A winding 172 of resistance wire is radially formed about the bifurcated, cylindrical portion 166 with the opposite electrical ends of the winding 172 being attached to the grommets 170. Screws 162 passing sequentially through the grommets 170, the tubular standoffs 150 of the rectifier 40, and engaging the field terminals 94a, 94b of the rotor are utilized to provide electrical contact between the various facially mating surfaces of the field terminals 94a, 94b, the rectifier output terminals 154, 156, and the resistor 42. It will be appreciated that, as a result of the relatively flexible nature of the base 168 and the compliant nature of the grommets 170 of the resistor 42, and the ability of the field terminals to move to some extent in the axial direction while being restrained radially, as described previously, a flexible electrical connection system is provided for the DC rails 40d, 40f which precludes subjecting the diodes in the rectifier structure to axial loading by the screws 162 or bending loads due to slight misalignments of the various mating surfaces of the field terminals 94a, 94b, the rectifier 40, and the resistor 42.

A portion of the radially outer periphery of each of the field plates 120, 121 is configured to closely adjoin the radially inner surface 78 of the annular wall 70, as shown at 220a, 220b, 220c, 220d, 220e, 220f in FIG. 7b, thereby providing radial support of the rectifier 40 within the cavity 86. The rectifier support surface 84 and a portion of the radially outer periphery of the field plates 120, 121 are configured in a complementary manner such that the rectifier support surface 84 engages the field plates 120, 121 in order to impart rotative motion to the rectifier 40 about the axis of rotation 34 when the shaft 32 is rotated about the axis of rotation 34. The field plates 120, 121 are also asymmetrically configured about the axis of rotation 34 to provide counter balance means such that the diodes 140 are not subject to loads generated by the field plates 120, 121 or the tubular standoffs 150 during rotation of the rotor 30.

An end cap 180 is provided, as shown in FIGS. 1, 2, and 3, for closing the open end 74 of the cavity 86, with the end cap 180 being secured in the cavity 86 by a snap ring 188. The end cap 180 includes four axially-opening recesses 182 for receipt of means for urging the rectifier 40 into facial contact with the rectifier support surface 84 in the form of four springs of elastomeric material 184. The elastomeric springs 184 of the exemplary embodiment are preferably fabricated from a fluocarbon material such as is sold under the tradename Viton by E.I. du Pont de Nemours and Company. The four elastomeric springs 184 are disposed in an equally spaced pattern about the axis of rotation and are sized such that each spring supplies a compressive load of 5–10 pounds against the resistor 42 to urge the rectifier 40 into contact with the rectifier support surface 84.

The shaft 32 of the exemplary embodiment is primarily constructed of an electrically conductive material. Accordingly, to provide electrical insulation between the threaded fasteners 90a, 90b, 90c and the field terminals 94a, 94b extending through the radially-extending wall 80 of the shaft 32, and to provide electrical insulation between the two phase plates 120, 121, which closely adjoin the radially inner surface 78 of the shaft 32, the radially-extending wall 80, including the rectifier support surface 84, and a portion of the axially-extending inner wall of the shaft 78 adjacent the rectifier 40 are constructed of an electrically insulative material integrally joined to the electrically conducted portion of the shaft by a process such as shrink fitting. The radially-extending wall of electrically insulative material 80a and the insulative portion of the axially-extending inner surface of the wall 78a are shown removed from the electrically conducted portion of the shaft in FIGS. 1 and 2 and shown installed within the shaft in FIGS. 3 and 4. It will be recognized that for embodiments wherein the electrically insulative parts 80a and 78a could alternatively be fabricated as a single piece inserted into the rectifier cavity through the through slot 66 prior to installation of the main field assembly 38. It will further be recognized that, where the shaft 32 is fabricated from an electrically nonconductive material, the material, radially-extending wall 80a, and portion of the radially inner wall 78a are not required in practicing the instant invention.

The rotor 30 of the exemplary embodiment includes a number of features which in combination provide means for directing a flow of cooling fluid through the rectifier 40 and about the resistor 42, as indicated schematically in FIG. 5. As seen in FIGS. 3, 4, and 2, the means for directing a flow of cooling fluid through the rectifier 40 and about the resistor 42 include an axially-oriented oil inlet port 200 extending through the end cap 180 for receipt of oil from a transfer tube (not shown). Oil received from the inlet port 200 of the end cap 180 flows into a resistor cavity 201 to provide cooling for the winding 172 of the resistor 42 in an enhanced manner due to the bifurcations in the axially-bifurcated cylindrical portion 166 of the resistor 42 which allow the cooling fluid to directly contact a significant portion of the winding 172.

The cooling fluid exiting the resistor cavity 201 splits into two parallel paths, with the first path exiting the resistor cavity 201 via a plurality of passages such as indicated at 202 of FIG. 4, with the coolant flowing through passages 202 entering the cavity about the exciter armature assembly 36 and flowing through the interstitial spaces of the exciter armature winding to exit the cavity via the slots 106a, 106b, 106c and to enter a rectifier cavity 203. Two axially-directed orifices 204 spaced on alternate sides of the axis of rotation 34 and extending through the base 168 of the resistor 42 in conjunction with a central hole 205 in the field plate adjacent to the resistor 42 provide the second path for cooling fluid to exit the resistor cavity 201 and enter the rectifier cavity 203. By virtue of the construction of the rectifier 40, the cooling fluid within the rectifier cavity 203 can intimately contact the semiconductor diode devices 140, the phase plates 126, 128, 130, and the field plates 121, 120 to efficiently remove heat generated by the semiconductor diode devices 140. Cooling fluid exits the rectifier cavity 203 via a second hole 205 in the field plate adjacent the rectifier support surface 88 in conjunction with a central hole 206 provided in bar 82. Cooling fluid exiting the rectifier cavity 203 enters a cavity defined by the through slot 66 and the can 114 with the cooling fluid flowing through interstitial spaces between wires constituting the field winding 38a and exiting the rotor 30 via the first hollow end shaft 68 and an exit port 208 at the distal end of the first hollow end shaft 68.

The previously-described embodiments of the instant invention have many advantages, including the achievement of the long-held goal of reducing a rotating rectifier to an essentially elemental form. Virtually all parasitic structures, such as support housings, internal wiring, and electrical connectors, required by prior art rotary rectifiers have been eliminated. All elements of the rectifier of the instant invention perform dual functions as structure and as essential elements of an electrical circuit. The rectifier of the instant invention is also extremely simple in construction and easily fabricated at low cost from a minimum number of parts. Specifically, the rectifier assembly of the exemplary embodiment is constructed from four discreet parts, namely a phase plate with an integrally-formed apertured tab, a tubular standoff which is attached to the phase plate, a semiconductor diode device, and a phase plate having an integrally-formed apertured tab for connection to a source of alternating current.

The suppression resistor of the instant invention is also extremely simple and easily fabricated at low cost from a minimum number of parts and includes integrally-formed electrical terminals, thereby eliminating the need for any wiring extending between the resistor and the rails of the rotor.

Those skilled in the art will also appreciate that, by virtue of a combination of the simplified electrical interconnection features provided by the rotating rectifier, the suppression resistor, and the rectifier support surface, the various parts of the rotor cannot be inadvertently electrically misconnected, which significantly facilitates manufacture and repair of the rotor.

It will further be appreciated that the above advantages have not been achieved at a cost of reduced ease of repair and replacement of the rotating rectifier 40 and the resistor 42 assembly. Either the resistor 40 or the rectifier 42 may be removed and replaced by removing a minimum number of screws, specifically two screws 162, to replace the resistor 42 and three more screws 160 to replace the rectifier 40.

In contrast to many of the prior art rectifiers, it is not necessary to physically move any wires in order to replace either the resistor 42 or the rectifier 40, thereby resulting in improved reliability of the rotor 30 and essentially eliminating the need for rebalancing the rotor 30 subsequent to replacement of a rectifier 40 or a resistor 42 as was often required in prior art rectifiers wherein the wires of necessity had to be moved in order to remove or to install the rectifier and resistor. With regard to balancing of the rotor 30, the rectifier 40, and resistor 42 of the instant invention, by virtue of their construction as taught herein, are inherently balanced for rotation about the axis of rotation 34 which allows either the rectifier 40 and resistor 42 to be replaced without the need for rebalancing the rotor.

Those skilled in the art will also appreciate that the exemplary embodiment of the rotor of the instant invention includes a number of features which provide an extremely effective and efficient means for providing a flow of cooling fluid about the resistor 42 and the rectifier 40, thereby enhancing reliability.

As a consequence of these and other advantages provided by the instant invention, it is possible to achieve a significant reduction in the axial length of a rotor for a dynamoelectric machine and to thereby provide a new and improved dynamoelectric machine.

The assignee of the instant invention has built and performed electrical and thermal testing on a non-rotating mockup of a brushless alternator similar to the exemplary embodiment of the instant invention in a 75/90 KVA rating. The mockup was essentially complete with the exception that the rotor had no bearing supports. The rectifier of the mockup was approximately 0.75" shorter in axial length than previously known state-of-the-art rectifiers having a housing and electrical interface means to provide a modular rectifier and 0.250" smaller in diameter. The shorter length of the rectifier in combination with the efficient electrical interconnect means as taught by the instant invention resulted in an alternator which was estimated to be approximately 2.6" shorter than an equivalent 75/90 KVA generator utilizing a prior art rectifier and rotor.

Based on the information gained in the exercise of building and testing the previously-described mockup of the 75/90 KVA alternator, the assignee of the instant invention subsequently designed and built a fully functional brushless alternator incorporating the teachings of the instant invention in a 60/75 KVA rating with similar positive results in the form of a significant reduction in overall size and improvements in manufacturability, reliability, and reductions in cost, of the brushless alternator.

Although the instant invention has been described in considerable detail with reference to certain preferred embodiments thereof, other embodiments are possible.

Figure 12:
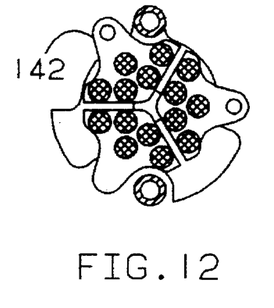
FIG. 12 illustrates an alternate embodiment of a rectifier according to the instant invention.

For example, the apertured tabs of the phase plates may be fabricated in a number of ways still within the teachings of the instant invention which may provide advantages when combined with alternate rotor constructions. Specifically, as illustrated in FIG. 12, which is essentially equivalent to FIG. 11, an alternate apertured tab configuration 142, having a thickness in the range of 0.010" to 0.035" is illustrated which does not utilize the flexible arm portion 146 of the previously-described exemplary embodiment.

Figures 13, 14, 15, 16, 17, 18:
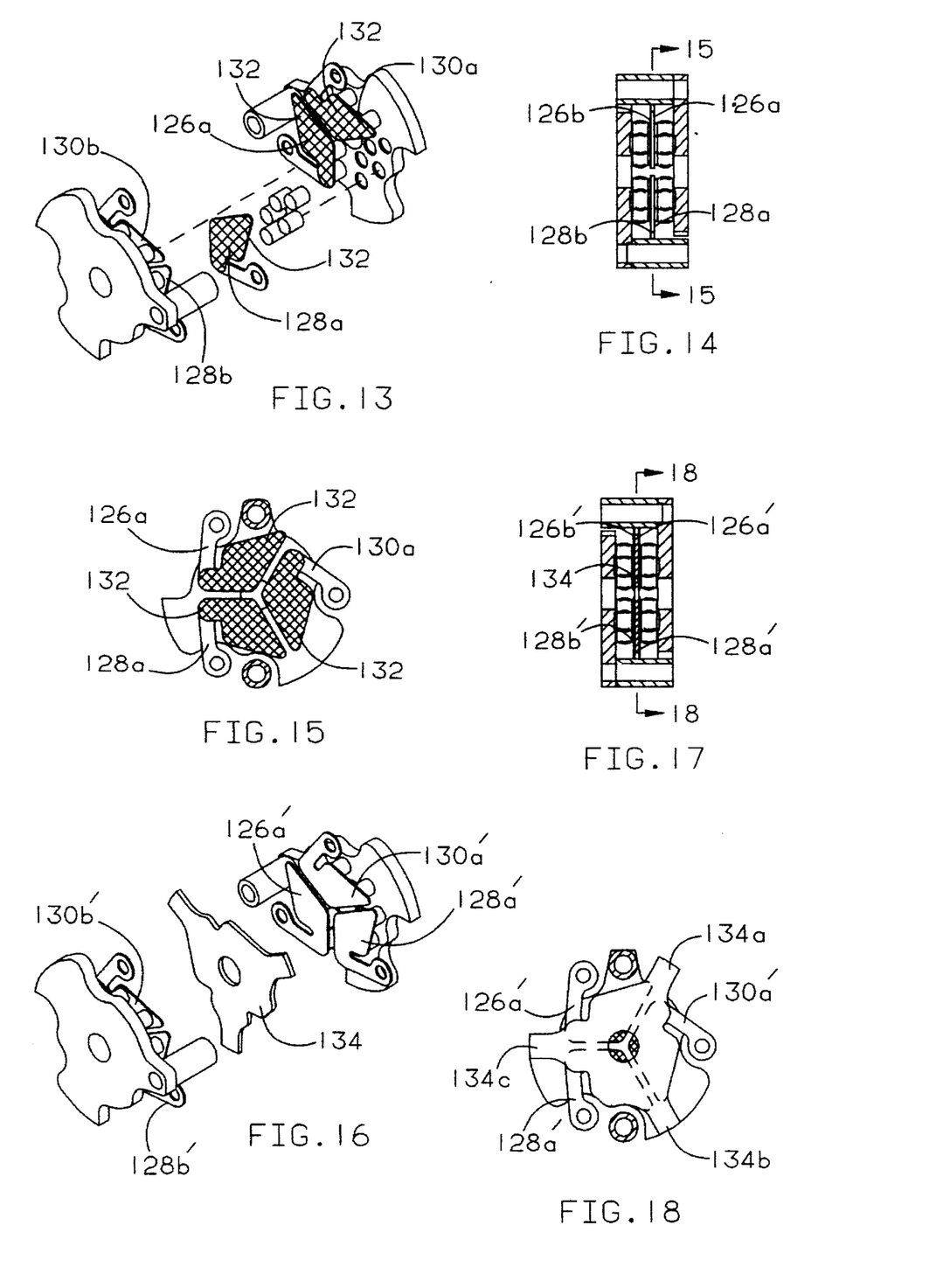
FIGS. 13–15 illustrate a second alternate embodiment of a rectifier according to the instant invention.
FIGS. 16–18 illustrate a third alternate embodiment of a rectifier according to the instant invention.

A second and highly preferred alternative construction of the phase plates is illustrated in FIGS. 13, 14, and 15 wherein each of the phase plates 126, 128, 130 is a laminated structure formed respectively by two very thin, approximately 0.010" to 0.016" thick, layers of material, herein also referenced as half phase plates, 126a, 126b, 128a, 128b, 130a, 130b, selectively joined as indicated by cross-hatched areas 132 in FIGS. 13 and 15 along the faying surfaces in the phase plate areas and not joined in the apertured tab areas to provide an arm portion 146 having increased axial flexibility. A rectifier, according to this embodiment of the instant invention, constructed by the method of first constructing two half rectifiers, each consisting of a set of three half-phase plates and one field plate sandwiching a layer of diodes integrally joined to the half-phase and the field plates with a high-temperature solder and subsequently joining the two half rectifiers together with a lower-temperature solder, again selectively applied in the areas as indicated by 132 in FIG. 15 has been shown to provide superior resistance to thermally induced failures of the semiconductor diode devices when the rectifier is exposed to extreme temperature cycles.

Yet another embodiment of the instant invention is depicted in FIGS. 16, 17, and 18 which offers significant advantages when the invention is applied in rotors utilized at extremely high rotational speeds. The construction of this embodiment is essentially identical to the embodiment as depicted in FIGS. 13, 14, and 15, with the exception of the further inclusion of a central support plate 134 of electrically insulative material sandwiched between two layers of phase plates 126a', 126b', 128a', 128b', 130a', 130b'. As seen in FIGS. 16 and 18, the central support plate 134 may also include radially-spaced legs 134a, 134b, 134c configured to closely adjoin the radially inner surface 78 of the shaft 32 to provide additional radial support for the rectifier 40 within the rotor 30. The central support plate 134 may be provided in the form of a ceramic material having metallized surfaces such that the faying surfaces of the support plate 134 and the phase plates 126a', 126b', 128a', 128b', 130a', 130b' may be joined by soldering or brazing. Alternatively, where extreme high temperature is not a consideration, the central support plate may be made of a composite material and adhesively bonded between the phase plates 126a', 126b', 128a', 128b', 130a', 130b'. As seen in FIGS. 18 and 20, the central support plate provides a common structural element uniting the individual phase plates 126a', 126b', 128a', 128b', 130a', 130b' in an electrically isolated manner and provides additional restraint against radially outward movement of the phase plates and the diodes as a result of loads generated by centrifugal forces at extremely high speeds which might otherwise subject the semiconductor diode devices or the joint between the semiconductor diode devices and the phase plates to excessive stresses.

It is noted that, with this construction, the apertured tabs of the phase plates will be axially spaced due to the insertion of the central support plate 134, thereby creating the equivalent of six separate phase plates supported by an insulative support structure in the form of the central plate 134. When the rectifier of this embodiment is utilized in conjunction with the rotor of the instant invention, however, the flexibility of the individual arms 146 of the tabs 148 allows the screws 160 to draw the two axially-spaced phase plate layers into electrical contact with one another.

It will be appreciated by those skilled in the art that by practicing various aspects of the instant invention, all of the alternate embodiments of the rectifier as described above may alternately be utilized in the rotor of the exemplary embodiment.

It should also be emphasized that the various embodiments as described herein have all included the description of a three-phase, full-wave rectifier. The instant invention is in no way limited to such a device and may be practiced in a wide variety of half- and full-wave rectifiers having multiple phases or a single phase of alternating current as an input. It is further understood that, although groupings of five semiconductor diode devices have been illustrated in the specific embodiments described and illustrated herein to form six diodes 56–61 required for a full-wave, three-phase rectifier, a greater or lesser numbers of diodes could also be used in practicing the instant invention with the actual number selected being dictated by the particular diode device selected and the current required to be rectified.

Accordingly, the spirit and scope of the appended claims should not be limited to the description of the preferred embodiments contained herein.

I claim:

1. A rectifier assembly configured for rotation about an axis of rotation, the rectifier comprising:
   (a) two axially-spaced field plates having generally planar major surfaces oriented perpendicularly to the axis of rotation;
   (b) two layers of diodes sandwiched between the field plates;
   (c) a layer of phase plates electrically isolated from one another sandwiched between the layers of diodes; and
   (d) means for integrally joining the diodes to the field plates and to the phase plates to form a unitary, laminated structure rotatable about the axis of rotation.

2. The rectifier assembly of claim 1 further including means for electrically connecting each of the phase plates to an alternating current source and means for electrically connecting each of the field plates to an electrical load.

3. The rectifier assembly of claim 2 wherein the means for electrically connecting the phase plates is provided by an apertured tab formed integrally with and connected to each phase plate.

4. The rectifier assembly of claim 3 wherein each phase plate is formed of a thin layer of material, and the apertured tab includes at a distal end thereof a ring terminal portion defining the aperture, the ring terminal portion being connected to the phase plate by a flexible arm portion, thereby providing means for the ring terminal portion to be displaced axially without imposing excessive bending stresses upon either the phase plate or the diodes.

5. The rectifier assembly of claim 4 wherein the phase plates are a laminated structure formed by two very thin layers of material selectively joined in the phase plate areas and not joined in the apertured tab areas to provide an arm portion having increased axial flexibility.

6. The rectifier assembly of claim 2 wherein the means for attaching the field plates is provided by an apertured tab formed integrally with and connected to each of the field plates.

7. The rectifier assembly of claim 6 wherein:
   the major surfaces of the field plates opposite the diode layers define a pair of generally parallel, axially-facing rectifier mounting faces;
   the apertured tab of each of the field plates includes an axially-facing electrical contact surface coplanar with the rectifier mounting face defined by the field plate to which the respective tab is attached; and
   the means for electrically connecting the field plates further includes a pair of tubular standoffs disposed about the apertures and attached to the apertured tabs of the field plates in a manner allowing the tubular standoffs to extend axially past the laminated structure of the rectifier in an electrically isolated fashion to provide a pair of axially-facing electrical contact surfaces coplanar with the rectifier mounting faces such that at each rectifier mounting surface, a coplanar pair of output terminals is provided in the form of the electrical contact surface of the apertured tab of one of the field plates and the electrical contact surface of the tubular standoff attached to the opposite field plate, thereby allowing either of the field plates to be accessed in an axial direction from either rectifier mounting surface.

8. The rectifier assembly of claim 2 wherein the major surfaces of the field plates opposite the diode layers define a pair of generally parallel axially-facing mounting faces and wherein the means for electrically attaching the phase plates and field plates are oriented along and symmetrically about an axis of symmetry passing perpendicularly through the axis of rotation such that the rectifier may facially engage a mounting structure at either rectifier mounting face without cross connection of the phase and field plates.

9. The rectifier assembly of claim 2 wherein the field plates are asymmetrically configured about the axis of rotation to provide counterbalance means such that the diodes are not subjected to loading due to inertial forces which might be generated in the field plates without the counterbalance means during rotation of the rectifier about the axis of rotation.

10. The rectifier assembly of claim 1 wherein the phase plates are a laminated structure formed by two very thin layers of material integrally joined along faying surfaces thereof.

11. A rectifier assembly configured for rotation about an axis of rotation, the rectifier comprising:
   (a) two axially-spaced field plates having generally planar major surfaces oriented perpendicularly to the axis of rotation;
   (b) two layers of diodes sandwiched between the field plates;
   (c) two layers of phase plates sandwiched between the layers of diodes;
   (d) a central support plate of electrically insulative material sandwiched between the layers of phase plates; and (e) means for integrally joining the diodes, the field plates, the phase plates, and the central support plate to form a unitary, laminated structure rotatable about the axis of rotation.

12. A rotor for a dynamoelectric machine comprising:
  (a) a rotating member configured for rotation about an axis of rotation and including a source of alternating current and an electrical load; and
  (b) a rectifier attached to the rotating member for rotation about the axis of rotation and electrically connected between the source of alternating current and the load, the rectifier comprising the following:
    (1) two axially-spaced field plates having generally planar major surfaces oriented perpendicularly to the axis of rotation;
    (2) two layers of diodes sandwiched between the field plates;
    (3) a layer of phase plates electrically isolated from one another sandwiched between the layers of doides; and
    (4) means for integrally joining the diodes to the field plates and to the phase plates to form a unitary, laminated structure rotatable about the axis of rotation.

13. The rotor of claim 12 further including means for directing a flow of cooling fluid through the rectifier.

14. The rotor of claim 12 further including a resistor electrically connected in a parallel circuit relationship with the electrical load.

15. The rotor of claim 14 further including means for directing a flow of cooling fluid through the rectifier and about the resistor.

16. The rotor of claim 12 wherein the rotating member further includes a cavity defined by an axially-extending inner surface of the rotating member and a generally radially-extending rectifier support surface defined by a generally radially-extending wall of the rotating member.

17. The rotor of claim 16 wherein a portion of a radially-outer periphery of one of the field plates is configured to closely adjoin the axially-extending inner surface of the rotating member, thereby providing radial support of the rectifier within the cavity.

18. The rotor of claim 17 wherein the rectifier support surface and a portion of the axially-extending inner surface of the rotating member adjacent the rectifier are constructed of an electrically insulative material.

19. The rotor of claim 16 wherein the rectifier support surface and the one of the field plates are configured in a complementary manner such that the rectifier support surface engages the one of the field plates for imparting rotative motion to the rectifier about the axis of rotation when the rotating member is rotated about the axis of rotation.

20. The rotor of claim 16 further including means for urging the rectifier into contact with the rectifier support surface.

21. The rotor of claim 20 wherein the means for urging the rectifier into contact includes an elastomeric spring.

22. The rotor of claim 12 wherein the rotating member further includes a generally radially-extending rectifier support surface defined by a generally radially-extending wall of the rotating member,
  the rectifier support surface including a plurality of electrically isolated phase and field terminals each having an axially facing electrical contact surface.

23. The rotor of claim 22 further including means for electrically connecting the phase plates of the rectifier to the phase terminals of the rotating member and means for electrically connecting the field plates of the rectifier to the field terminals or the rotor.

24. The rotor of claim 23 wherein the rectifier further includes the following:
  (a) an axially-facing rectifier mounting face at one axial end thereof configured to contact the rectifier support surface of the rotating member;
  (b) a plurality of field connection means disposed to mate with the field terminals of the rectifier support surface when the rectifier mounting face is in contact with the rectifier support surface of the rotating member; and
  (c) a plurality of phase connection means disposed to mate with the phase terminals of the rectifier support surface when the rectifier mounting face is in contact with the rectifier support surface of the rotating member.

25. The rotor of claim 24 wherein the rectifier mounting face is defined by the major surface opposite the diode layers of one of the field plates.

26. The rotor of claim 23 wherein the rectifier further includes the following:
  (a) a first and a second axially-facing rectifier mounting face at alternate axial ends thereof configured to alternatively contact the rectifier support surface of the rotating member;
  (b) a plurality of field connection means disposed to mate with the field terminals of the rectifier support surface when either the first or the second rectifier mounting face is in contact with the rectifier support surface of the rotating member; and (c) a plurality of phase connection means disposed to mate with the phase terminals of the rectifier support surface when either the first or the second rectifier mounting face is in contact with the rectifier support surface of the rotating member.

27. The rotor of claim 26 wherein the rectifier mounting faces are defined by the major surfaces of the field plates opposite the diode layers.

28. The rotor of claim 26 wherein the field connection means of the rectifier are provided by the following:
  (a) an apertured tab formed integrally with and connected to each of the field plates, with the apertured tab of each of the field plates including an axially-facing electrical contact surface coplanar with the rectifier mounting face defined by the field plate to which the respective tab is attached; and
  (b) a pair of tubular standoffs disposed about the apertures and attached to the apertured tabs of the field plates in a manner allowing the tubular standoffs to extend axially past the laminated structure of the rectifier in an electrically isolated fashion to provide a pair of axially-facing, electrical contact surfaces coplanar with the electrical contact surfaces defined by the rectifier mounting faces such that at each rectifier mounting face a coplanar pair of output terminals is provided in the form of the apertured tab of one of the field plates and the axially-facing electrical termination of the tubular standoff attached to the opposite field plate, thereby allowing either of the field plates to be accessed in an axial direction from either rectifier mounting face.

29. The rotor of claim 28 further including threaded fastener means for securing the field connection means of the rectifier in electrical contact with the field terminals of the rotating member.

30. The rotor of claim 29 further including a resistor having a base of insulative material including a pair of electrical terminals disposed in axial and radial alignment with the output terminals of the rectifier, the base and electrical terminals of the resistor being configured to mate respectively with one of the rectifier mounting faces and the output terminals of the rectifier, and the threaded fastener means securing the electrical terminals of the resistor in electrical contact with the output terminals of the rectifier.

31. The rotor of claim 23 wherein the field terminals of the rotating member are configured to extend through the radially-extending wall of the rotor in a manner to be slidable in an axially-oriented direction such that the field terminals may move axially into facial contact with the field connection means of the rectifier.

32. The rotor of claim 23 wherein the means for electrically connecting the phase plates are provided by an apertured tab formed integrally with and connected to each of the phase plates.

33. The rotor of claim 32 further including threaded fastener means for securing the phase connection means of the rectifier in electrical contact with the phase terminals of the rotating member.

34. The rotor of claim 32 wherein the apertured tabs include at a distal end thereof a ring terminal portion defining the aperture, the ring terminal portion being connected to the phase plate by a flexible arm portion, thereby providing means for the ring terminal portion to be displaced axially from the phase plate to contact one of the phase terminals of the rotating member when either rectifier mounting face is in facial contact with the rectifier mounting surface of the rotating member.

35. A rectifier assembly comprising:

two half-rectifier assemblies each having a layer of diodes sandwiched between a field plate and one or more phase plates;

said diodes being integrally joined to said field and phase plates by soldering with a first solder having a melting temperature;

said phase plates of said half-rectifiers being integrally joined to one another by soldering with a second solder having a melting temperature lower than the melting temperature of the first solder.

* * * * *